(12) United States Patent
Sukhenko et al.

(10) Patent No.: US 8,566,779 B2
(45) Date of Patent: Oct. 22, 2013

(54) VISUALLY PRIORITIZING INFORMATION IN AN AGILE SYSTEM

(75) Inventors: Felix Sukhenko, San Francisco, CA (US); Steve Greene, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 247 days.

(21) Appl. No.: 13/100,171

(22) Filed: May 3, 2011

(65) Prior Publication Data

US 2011/0289475 A1 Nov. 24, 2011

Related U.S. Application Data

(60) Provisional application No. 61/347,283, filed on May 21, 2010.

(51) Int. Cl.
 *G06F 9/44* (2006.01)
 *G06F 9/46* (2006.01)
 *G06Q 10/00* (2012.01)

(52) U.S. Cl.
 USPC .......... 717/103; 717/101; 717/102; 705/7.13; 705/7.21; 705/7.26; 718/103

(58) Field of Classification Search
 USPC ......... 717/100–103, 105, 109, 113; 705/7.13, 705/7.21, 7.26; 718/102, 103
 See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |

(Continued)

OTHER PUBLICATIONS

Zimin(e), Dmitri, "How to Prioritize a SCRUM Backlog," <http://www.softwarefrontier.com/2006/06/how-to-prioritize-scrum-backlog.html>, Jun. 8, 2006, p. 1-3.*

(Continued)

*Primary Examiner* — Qing Chen (74) *Attorney, Agent, or Firm* — Ingrassia Fisher & Lorenz, P.C.

(57) ABSTRACT

An apparatus and method for prioritizing tasks in a software development environment includes drag-and-drop functionality to prioritize tasks displayed in the window of a browser application executing on a user system. In one embodiment, a prioritizer screen is built at a server using information stored in a workload database object and sent to the user system over a network using interprocess communications.

22 Claims, 8 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,966,061 B1 * | 11/2005 | Vance et al. ............. 718/100 |
| 7,340,411 B2 | 3/2008 | Cook |
| 7,620,655 B2 | 11/2009 | Larsson et al. |
| 7,689,990 B2 * | 3/2010 | Tobias et al. ............. 718/100 |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0091691 A1 * | 7/2002 | Sharp ............................. 707/7 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0163799 A1 * | 8/2003 | Vasilik et al. ............. 717/100 |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0255265 A1 * | 12/2004 | Brown et al. ............. 717/101 |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0218554 A1 * | 9/2006 | Tobias et al. ............. 718/102 |
| 2007/0220479 A1 * | 9/2007 | Hughes ........................ 717/100 |
| 2010/0250322 A1 * | 9/2010 | Norwood ........................ 705/9 |
| 2012/0079449 A1 * | 3/2012 | Sanderson et al. ............. 717/102 |

OTHER PUBLICATIONS

Farrow et al., "Fast & Predictable—A Lightweight Release Framework Promotes Agility through Rhythm and Flow," 2008, IEEE, p. 224-228.*

Federoff et al., "Successful User Experience in an Agile Enterprise Environment," 2009, Springer-Verlag, p. 233-242.*

Mak et al., "Task Coordination in an Agile Distributed Software Development Environment," May 2006, IEEE, p. 606-611.*

Laanti, Maarit, "Implementing Program Model with Agile Principles in a Large Software Development Organization," 2008, IEEE, p. 1383-1391.*

Singh, Mona, "U-SCRUM: An Agile Methodology for Promoting Usability," 2008, IEEE, p. 555-560.*

Baptista, Joaquim, "Agile Documentation with uScrum," Sep. 2008, ACM, p. 275-276.*

* cited by examiner

| Backlog Rank | Work Id | Record Type | Priority | Subject | Story Pts | Theme | Scheduled Build | Sprint |
|---|---|---|---|---|---|---|---|---|
| 5 | W-902560 | Bug | P2 | RELENG HELP: Unable to use @integ@ tag successfully to checkin resolved integration conflicts >> | | | 172.internal | 2011.03a-GUS |
| 1 | W-896721 | Bug | P2 | When clicking to inline edit product area and cancel, the image of the picklist is left on the screen (see screen shot) - only in FireFox >> | | | GUS3.11 | 2011.02b-GUS |
| 2 | W-905561 | Bug | P2 | New help text for Comments on Work >> | | GUS User Experience and Productivity | 172.internal | 2011.03a-GUS |
| 3 | W-901903 | Bug | P2 | GUS UI changes to display locking Info - Error message text fix >> | | GUS - One-Stop | 172.internal | 2011.02b-GUS |
| 4 | W-903024 | Bug | P2 | User selecting report or list view on Team Dependency object should not have to filter by Record Type >> | | | 172.internal | 2011.03a-GUS |
| 6 | W-898112 | Bug | P2 | Incorrect CSS for global search box on Visualforce pages caused by CSS from ADM_ReleaseRelatedList on input type >> | | | 172.internal | 2011.03a-GUS |
| 7 | W-901955 | ToDo | P2 | Change GUS perforce trigger documentation to reflect the locking record new functionality >> | | GUS - One-Stop | 172.internal | 2011.02b-GUS |
| 8 | W-627219 | User Story | P1 | RELENG HELP: Allow @integ@ tagged bugs to checkin against bugs from previous branches >> | 5 | GUS User Experience and Productivity | GUS.e | 2011.10b-GUS |
| 9 | W-847738 | User Story | P1 | Minimize use of inline page and apex:detail combination >> | 2 | GUS User Experience and Productivity | 172.internal | 2011.02b-GUS |

VISUALLY PRIORITIZING INFORMATION IN AN AGILE SYSTEM

CLAIM OF PRIORITY

This application claims the benefit of U.S. Provisional Patent Application entitled "METHODS AND SYSTEMS FOR VISUALLY PRIORITIZING INFORMATION IN AN AGILE SYSTEM," filed May 21, 2010 (Application Control No. 61/347,283), the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to prioritizing a workload in an agile software environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

Many software developers have adopted the use of a Scrum process in an agile environment. Scrum is an iterative, incremental methodology for project management often seen in agile software development.

For example, product development may be organized into three basic business units, Applications, Platform and Core Infrastructure, and numerous Scrum teams distributed across these three business units. An example Scrum team could have dedicated developers, quality assurance engineers and a Product Owner. Each team also has a ScrumMaster, who is usually a program manager, development manager, or Quality Assurance (QA) manager. Depending on the complexity of the features being developed, the Scrum team may also have dedicated or part-time team members from other functional teams such as System Testing, Documentation, User Interface (UI) Design, Usability, Technology Operations, and Release Engineering.

In Scrum the development process is organized into a series of iterations called "sprints" which are typically two to four week periods during which a team produces a potentially shippable product increment.

The work to be done by a Scrum team is represented by the "backlog" which is a prioritized list of user "stories" or "subjects". The individual subjects may be part of a "theme".

Important tenets of agile software development are welcoming changing requirements, even late in development, close daily cooperation between business people and developers, face-to-face conversation between team members (co-location) and regular adaptation to changing circumstances.

BRIEF SUMMARY

Embodiments provide systems, mechanisms and methods for prioritizing tasks included in a workload backlog. In one embodiment, a method includes dragging and dropping tasks in a list displayed in the window of a browser application displayed on a user system to reprioritize the tasks. The method further includes building a new list at a server having the tasks reprioritized and displaying the new list in the window of the browser application executing on the user system.

While one or more implementations and techniques are described, one or more embodiments may be implemented in a system having an application server providing a front end for an on-demand database service capable of supporting multiple tenants. The embodiments described herein are not limited to multi-tenant databases or deployment on application servers. Embodiments may be practiced using other database architectures, e.g., ORACLE®, DB2® by IBM and the like, without departing from the scope of the embodiments claimed.

Any of the above embodiments may be used alone or together with one another in any combination. Embodiments described herein may also include embodiments that are only partially mentioned or alluded to, or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the embodiments described are not limited to the examples depicted in the figures.

FIGS. 4A-4C illustrate screen shots depicting drag-and-drop functionality.

DETAILED DESCRIPTION

General Overview

Systems and methods are described for prioritizing a backlog in an agile software environment.

System Overview

Embodiments described herein enable and facilitate the prioritization of a workload in a database environment such as an on-demand database services system. Such a prioritization system may be based on a multi-tenant cloud computing model. Embodiments enable a user to prioritize tasks in a backlog. These embodiments are described in detail below.

An example embodiment will now be described. A software tool facilitates prioritization of the Scrum team's backlog. The tool facilitates the display of the backlog as a prioritized list designated the "prioritizer". The prioritizer functions as a backlog stack for the Scrum team where stories to be built during a current Sprint are "popped" off the top of the stack. The tool provides an interface displayed in a standard browser application that provides drag-and-drop functionality to reprioritize items in the backlog list and to prioritize new items added to the list.

In this example embodiment, inter-process communications between a standard browser application running on a user system and a server are utilized. All processing to implement the drag-and-drop functionality is performed on the server and there is no requirement of downloading a plug-in application to interact with the browser application executing on the user system. The prioritizer screens generated on the server are displayed in a window of the browser application. The browser application and server communicate utilizing interprocess communications over a network.

Figure 1:
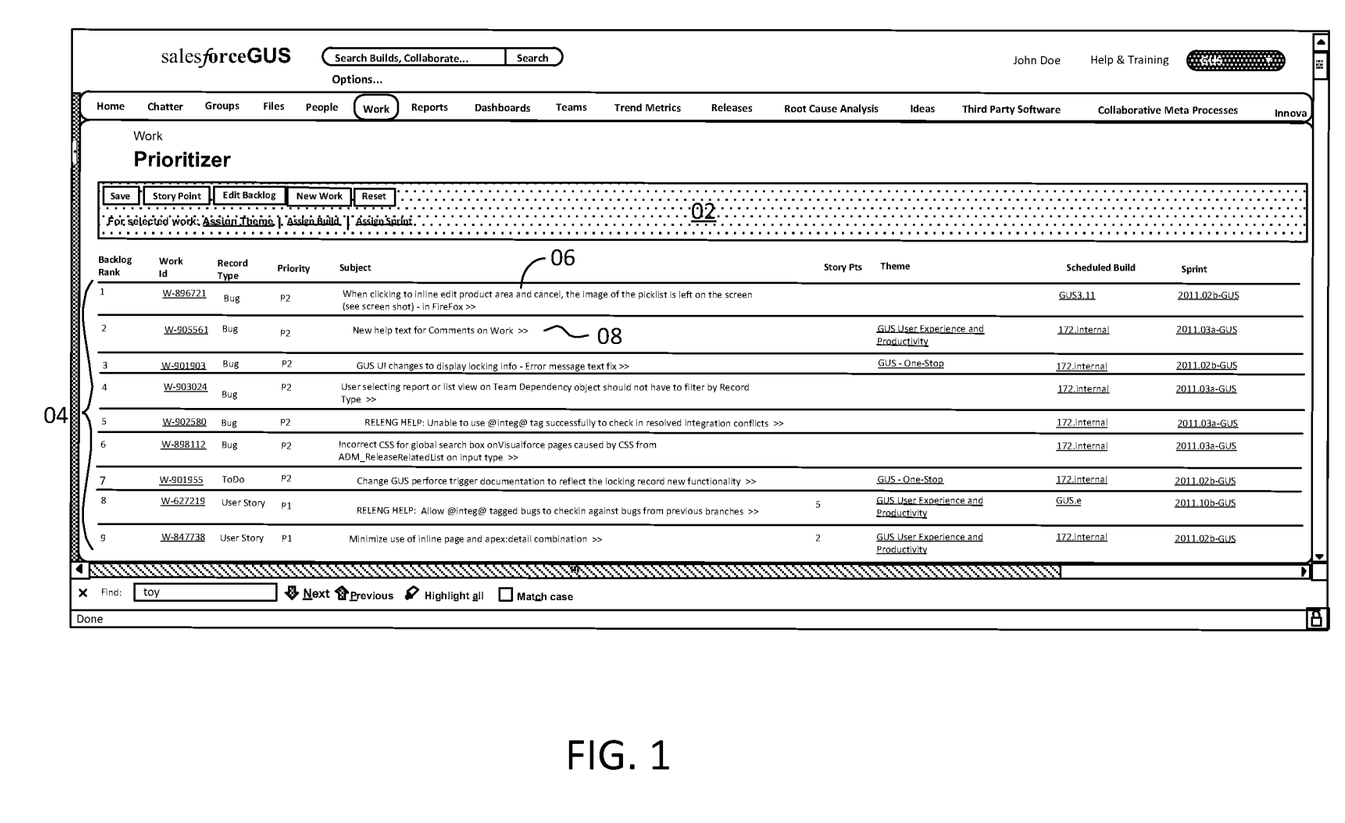
FIG. 1 illustrates a screen shot of an example user interface for prioritizing items in a backlog and for performing other functions, according to one embodiment.

FIG. 1 is a screen shot of a prioritization interface displayed in a browser window by the example embodiment. Referring now to FIG. 1, a tool bar 02 includes a "Save" button, a "Story Point" button, an "Edit Backlog" button, a "New Work" button and a "Reset" button. Also, a list of links "for selected work" includes an "Assign Theme" link, an "Assign Build" link and an "Assign Sprint" link.

A prioritizer screen 04 includes a set of rows 06 assigned to items in the Scrum team backlog. Each row includes a "Backlog Rank" field, a "Work Id" field, a "Record Type" field, a "Priority" field, a "Subject" field, a "Story Points" field, a "Theme" field, a "Scheduled Build" field and a "Sprint" field. Each row also includes a chevron icon 08 which, when clicked, activates a "Quick Edit" screen.

The meaning of each field depicted in the example embodiment of FIG. 1 will now be described. The "Backlog Rank" field identifies the priority assigned to the task by this team where during each sprint the team works on those tasks having the highest backlog rank. In this example embodiment, the "Backlog Rank" value is an integer which is part of a sequence. The integer "Backlog Rank" value indicates the position in the workload stack of the corresponding row. For example, in FIG. 1 the tasks having sequential "Backlog Rank" values of 1-9 are displayed. The rows are displayed visually as a stack with the row having the highest "Backlog Rank" of "1" ready to be popped off the top of the stack.

The "Work ID" field provides a link to the record in the multi-tenant data base object used to build the row. The "Record Type" field identifies the type of record in the multi-tenant database object that is used to build the row. For example, a "Bug" is a problem with the design, and a "User Story" describes new functionality to be built. The "Priority" field identifies a global priority assigned to the task and indicates a level of commitment to complete the task. The "Subject" field identifies the subject of the record. The "Story Points" field indicates the size of the effort relative to other efforts. For example, a field of three points indicates three times as much effort is required compared to a field of one point. In this example embodiment the efforts are graded using a Fibonacci sequence. The "Theme" field indicates the theme of which a User Story is a part. The "Scheduled Build" field identifies which code line that feature will go into when pushed out into production. The "Sprint" field indicates the time period when the task is to be completed. In this example embodiment the "Sprint" field value indicates a two week period so the value 2011.03a-GUS indicates the first two weeks of March 2011.

Team members meet regularly to determine the work to be completed during the coming Sprint. The backlog stack is initially filled as the result of envisioning efforts at the beginning of the project. For each Sprint, the team pulls an iteration's worth of work off the top of the stack and commits to implementing the work by the end of the Sprint. As described above, changing requirements and other factors require that during face-to-face meetings the priorities of different tasks might have to be changed.

In this embodiment, a drag-and-drop feature is implemented that allows the reprioritization of the backlog through interaction with the prioritized list displayed on the user system. This allows dynamic, visual reprioritization during a meeting. Items down in the stack can be dragged-and-dropped to the top of the stack and all the items are reprioritized. The changes are not made permanent until saved. Accordingly, items can be visually reprioritized, displayed in the prioritizer screen, discussed and then additional changes made if desired. When the team agrees on the new priorities a save operation commits the changes to the multi-tenant database object.

In this example embodiment, the prioritizer screen is generated by an online database system using information stored in a multi-tenant database such as that implemented by the assignee of the present application. The information to be displayed in each row of the prioritizer is accessed from a workload object in the multi-tenant database. The information in each row of the prioritizer screen is taken from a single row, also called a record, of the workload database object. Each row in the workload database object corresponds to a task to be performed by a team. Software executing on the server is utilized to build the prioritizer screen and other screens described below using information stored in database objects.

The rows in the workload database object include at least the fields described above that are displayed in the prioritizer screen. When the prioritizer screen is generated the rows in the display are ordered according to the values stored in the "Backlog Rank" field of the workload database object.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For agile software Scrum team database applications, such standard entities might include tables for Backlog, Builds, Deliverables and such, each containing predefined fields. It should be understood that the word "entity" may also be used interchangeably herein with "object" and "table."

In some database systems, users may be allowed to create and store custom objects, or they may be allowed to customize standard entities or objects, for example by creating custom fields for standard objects, including custom index fields.

Any suitable programming language including C, C++, Java, assembly language, etc. can be used to implement the routines of example embodiments. Different programming techniques can be employed, such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. In the example embodiment currently described the Apex programming language and the Visualforce user interface framework are used to implement drag-and-drop prioritizer functionality.

Figure 2:
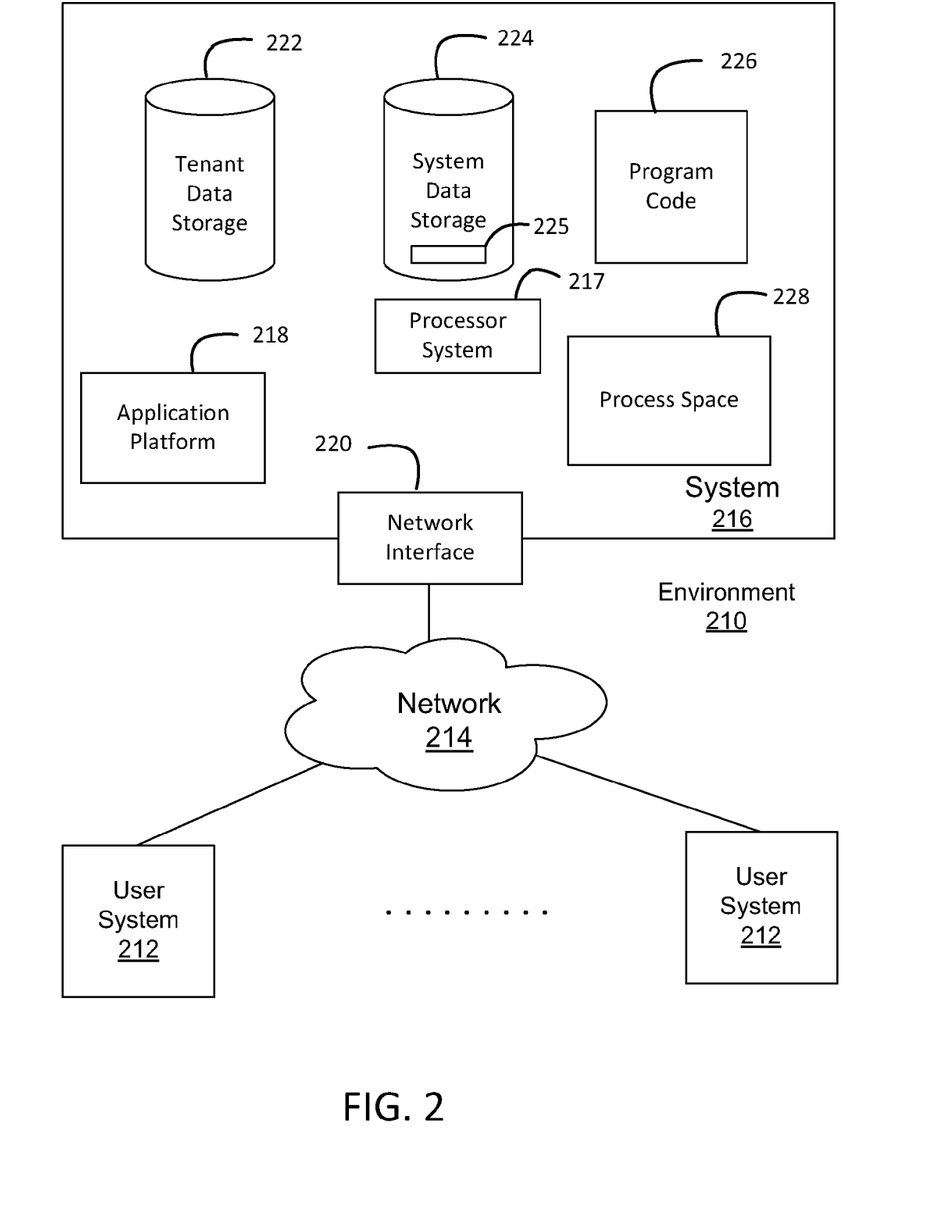
FIG. 2 illustrates a block diagram of an example environment, which may be used to implement the embodiments described herein.

FIG. 2 illustrates a block diagram of an on-demand database system environment that facilitates the implementation of an example embodiment. The environment may include user system 212, network 214 and online database system 216 or "server".

Several elements in the environment shown in FIG. 2 include conventional, well-known elements that are explained only briefly here. For example, a user system 212 could include a desktop personal computer, workstation, laptop, PDA, cell phone, or any wireless access protocol (WAP) enabled device or any other computing device capable of interfacing directly or indirectly to the Internet or other network connection. User system 212 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 212 to access, process and view information, pages and applications available to it from system 216 over network 214. A user system 212 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 216 or other systems or servers. For example, the user interface device can be used to access data and applications hosted by system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

User system 212 is able to communicate with server system 216 using TCP/IP, and at a higher network level uses other common Internet protocols to communicate, such as HTTP, FTP, AFS, WAP, etc. In an example where HTTP is used, user system 212 might include an HTTP client commonly referred to as a "browser" for sending and receiving HTTP messages to and from an HTTP server at online database system 216. Such an HTTP server might be implemented as the sole network interface between online database system 216 and network 214, but other techniques might be used as well or instead. In some implementations, the interface between online database system 216 and network 214 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

Network 214 is any network or combination of networks of devices that communicate with one another. For example, network 214 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

According to one embodiment, a user system 212 and all of its components are operator configurable using applications, such as a browser, including computer code run using a central processing unit such as an Intel Pentium® processor or the like. Similarly, online database system 216 and all of its components might be operator configurable using application(s) including computer code to run using a central processing unit such as processor system 217, which may include an Intel Pentium® processor or the like, and/or multiple processor units.

One arrangement for elements of online database system 216 is shown in FIG. 2, including a network interface 220, processor system 217, application platform 218, tenant data storage 222 for tenant data, system data storage 224 for system data 225 accessible to system 216 and possibly multiple tenants, program code 226 for implementing various functions of system 216, and a process space 228 for executing system processes.

According to one embodiment, each server system 216 is configured to provide web pages, forms, applications, data and media content to user (client) systems 212 to support the access by user systems 212 as tenants of system 216. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

A computer program product embodiment includes a machine-readable storage medium (media) having instructions stored thereon/in which can be used to program a computer to perform any of the processes of the embodiments described herein. Computer code for operating and configuring system 216 to intercommunicate and to process webpages, applications and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, as is well known in the art, the entire program code, or portions thereof, may be transmitted and downloaded from a software source over a transmission medium, e.g., over the Internet, or from another server or transmitted over any other conventional network connection (e.g., extranet, VPN, LAN, etc.) using any communication medium and protocols (e.g., TCP/IP, HTTP, HTTPS, Ethernet, etc). It is also well known that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages. (Java™ is a trademark of Sun Microsystems, Inc.).

The operation of an example embodiment of the drag-and-drop reprioritization feature will now be described with reference to the flow chart of FIG. 3 and the screen shots of FIGS. 4A-4C. In this embodiment the prioritizer screen is generated by the server 216 executing software on the application platform 218 and displayed in a window of a standard browser application operating on the user system 212. Interprocess communication between the server 216 and user system 212 takes place over the network 214 using, for example, TCP/IP.

Figure 3:
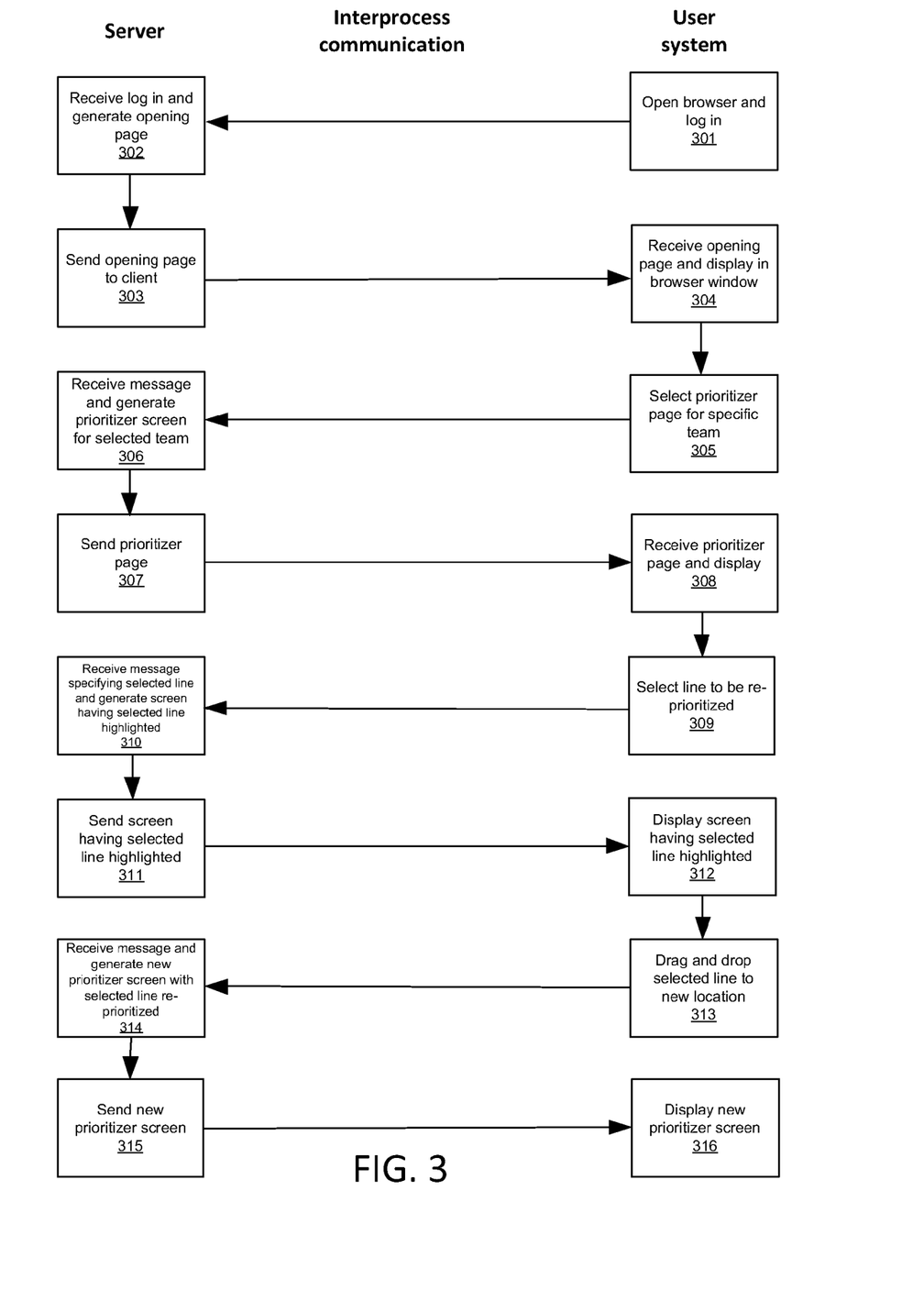
FIG. 3 illustrates an example simplified flow diagram for prioritizing items in a backlog and for performing other functions, according to one embodiment.
Figure 4A:
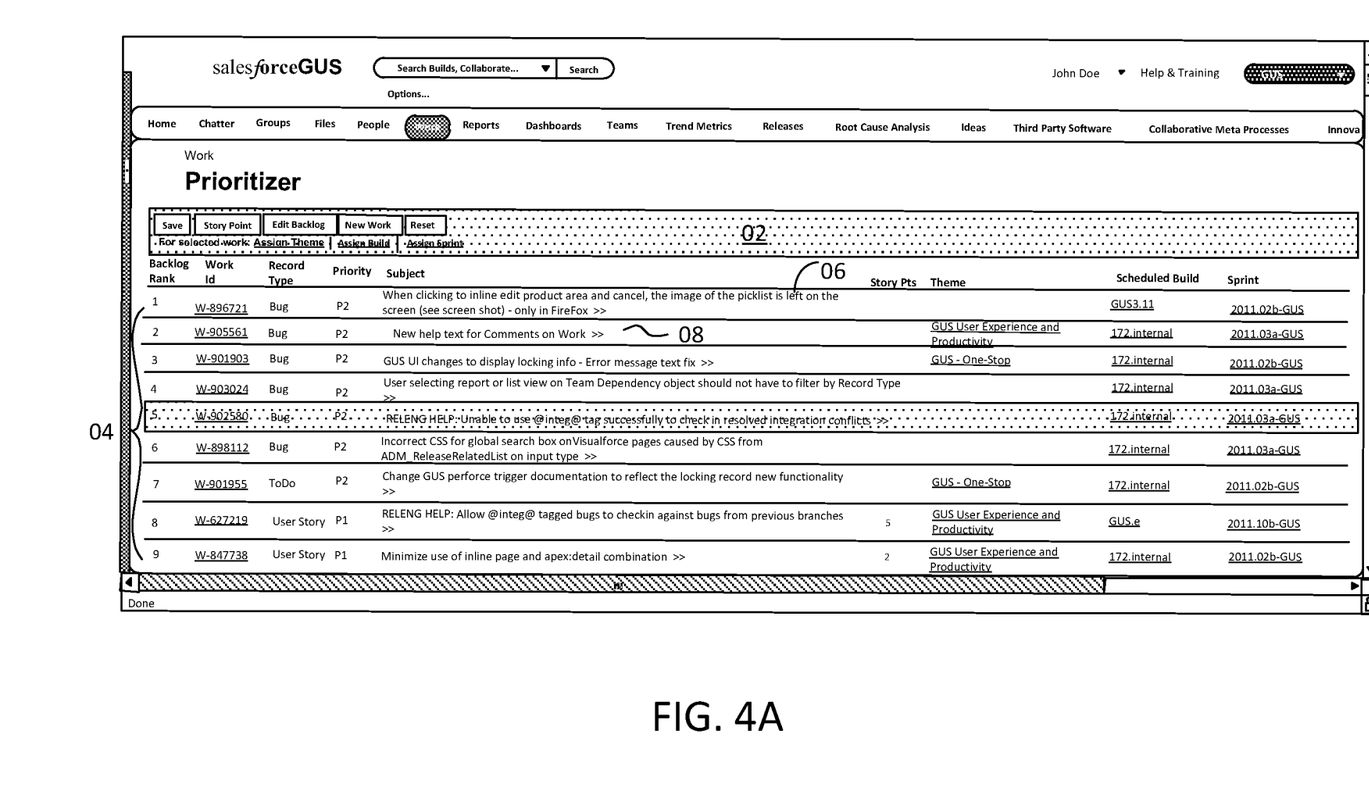
Figure 4B:
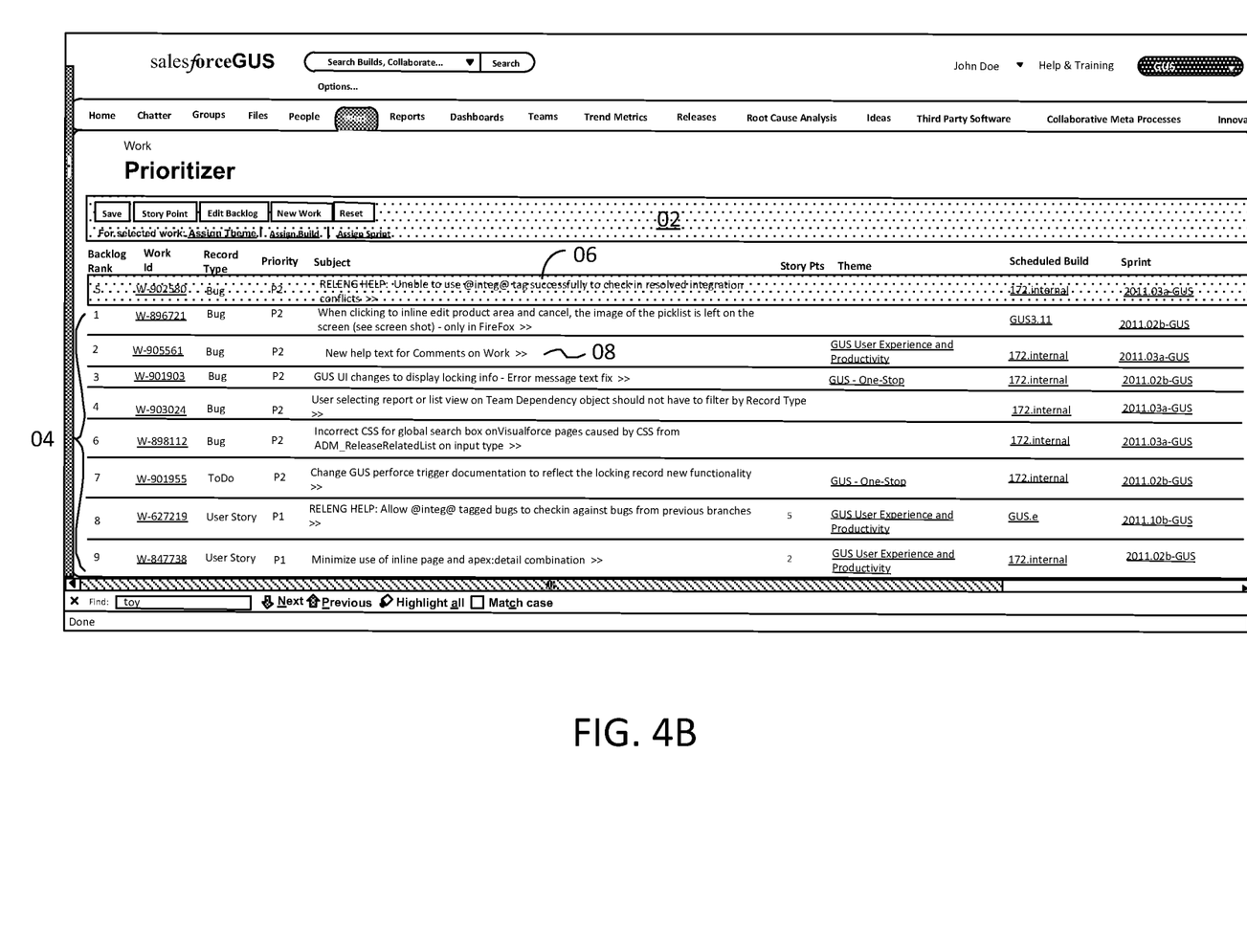

Referring now to FIG. 3, in process step 301 a user logs onto a client user system running a standard browser application. The user opens a web page and logs onto the server.

In process step 302 the server receives the log in information and generates an opening page and in process step 303 the opening page is sent to the client. In process step 304 the user system receives the opening page and displays the opening page in the browser window. In process step 305 the client selects the prioritizer page for a specific team.

In process step 306 the server 216 builds the prioritizer screen. In this embodiment software executing on the server accesses multi-tenant database records and builds the prioritizer screen. The look and feel of the prioritizer screen is customized using VisualForce software. The prioritizer screen is sent to the user system in process step 307.

In process step 308 the user system displays the prioritizer screen in the browser window. In process step 309 the user selects a line to be reprioritized by, for example, clicking on the line with a mouse. The user system sends an interprocess communication to the server with information indicating which line was selected.

In process step 310 the server receives the interprocess communication and generates a new prioritizer screen having the selected line highlighted. In process step 311 the new prioritizer screen is sent to the user system.

In process step 312 the prioritizer screen with the selected line highlighted is displayed in the browser window on the user system. For example, in FIG. 4A the fifth line of the prioritizer has been selected by the user and the line is highlighted.

In process step 313 the user then drags and drops the highlighted line to a desired new location in the stack and the user system sends an interprocess message to the server with information indicating the new location. For example, FIG. 4B depicts the screen after the highlighted fifth line has been dragged and dropped to the top of the stack.

In process step 314 software executing on the server receives the interprocess message and generates a reprioritized prioritizer screen with the selected line moved to the new location and inserts revised values of the backlog rank in each line based on the new position of the moved line. In process step 315 the reprioritized prioritizer screen is sent to the user system.

In process step 316 the reprioritized prioritizer screen is displayed in the browser window on the user system. For example, in FIG. 4C the former fifth line with backlog rank 5 is now displayed as the first line with backlog rank 1. The other lines have been reprioritized to reflect the new position of the formerly fifth line.

Accordingly, this example embodiment facilitates backlog management by a Scrum team using a cloud computing technique. All information pertaining to the backlog is maintained on the multi-tenant database on the server. A user can log in on any user system executing a browser application and have full drag-and-drop functionality for reprioritizing items in the backlog.

The screenshot depicted in FIG. 4C indicates the changes of priority of tasks implemented by using the above-described drag-and-drop functionality. However, these changes are not made to the workload database object until the "Save" button is clicked. This feature allows the team to brainstorm and rearrange the backlog until agreement is reached on the reprioritization. Once agreement is reached the "Save" button can be clicked and the changes are made to the workload database object on the server.

Figure 5:
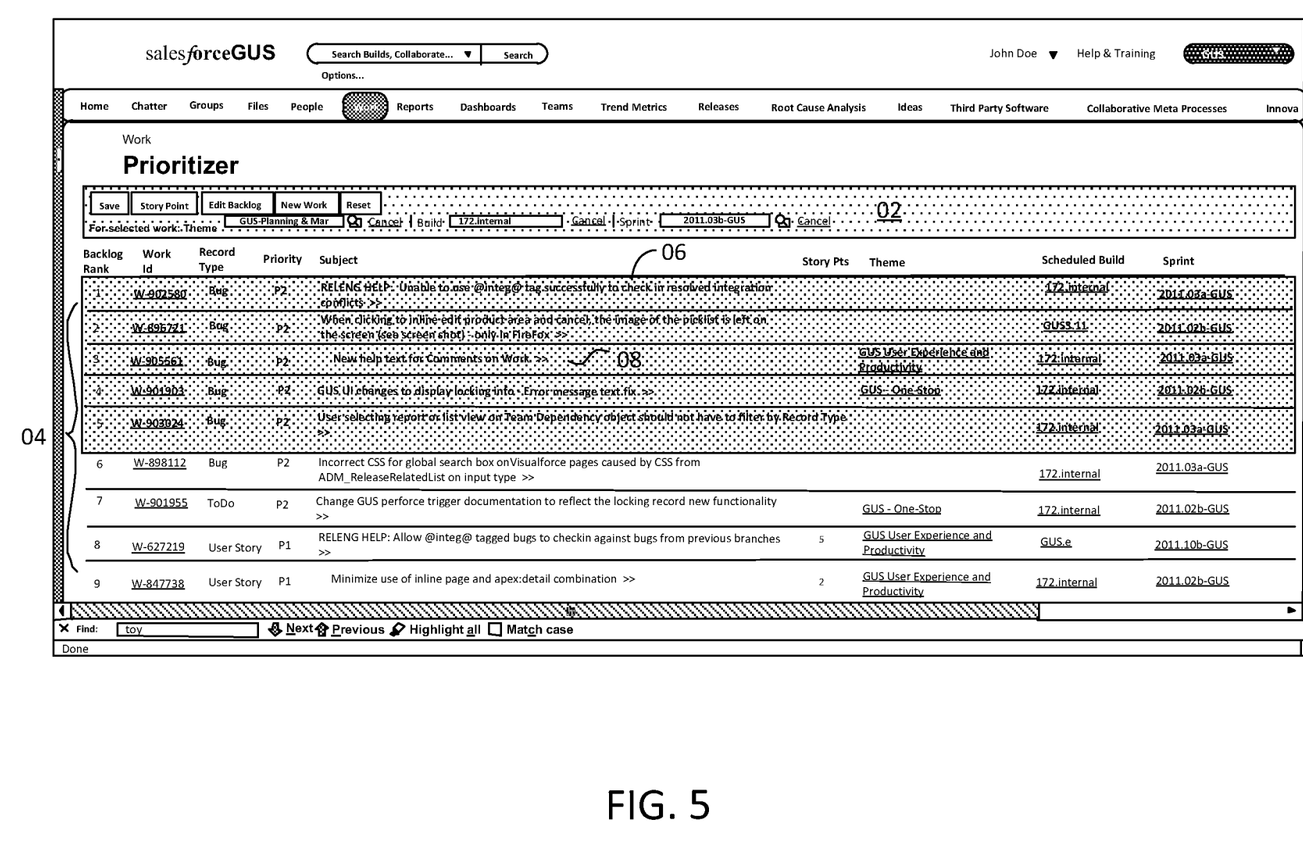
FIG. 5 illustrates a screen shot of the selection of multiple rows, according to one embodiment.

In this example embodiment multiple lines can be selected and dragged and dropped to new positions on the prioritizer screen. A group of adjacent lines can be selected by, for example, holding down the shift key or a group of non-adjacent lines can be selected by, for example, holding down the control key while individually selecting non-adjacent lines displayed in the prioritizer screen. For example, the selection of multiple rows is depicted in FIG. 5.

The functionality described above for highlighting multiple rows displayed in the prioritizer screen can also be used to implement a mass edit function. The actions displayed in the tool bar can be applied to the selected rows, for example the rows selected in FIG. 5. By selecting the "Assign Theme" action in the toolbar a different theme could be assigned to all the rows. The new theme is applied to the records in the database when the "Save" button on the tool bar is selected. The mass edit functionality enables a user to efficiently update records in the database object from the prioritizer screen interface.

Figure 6:
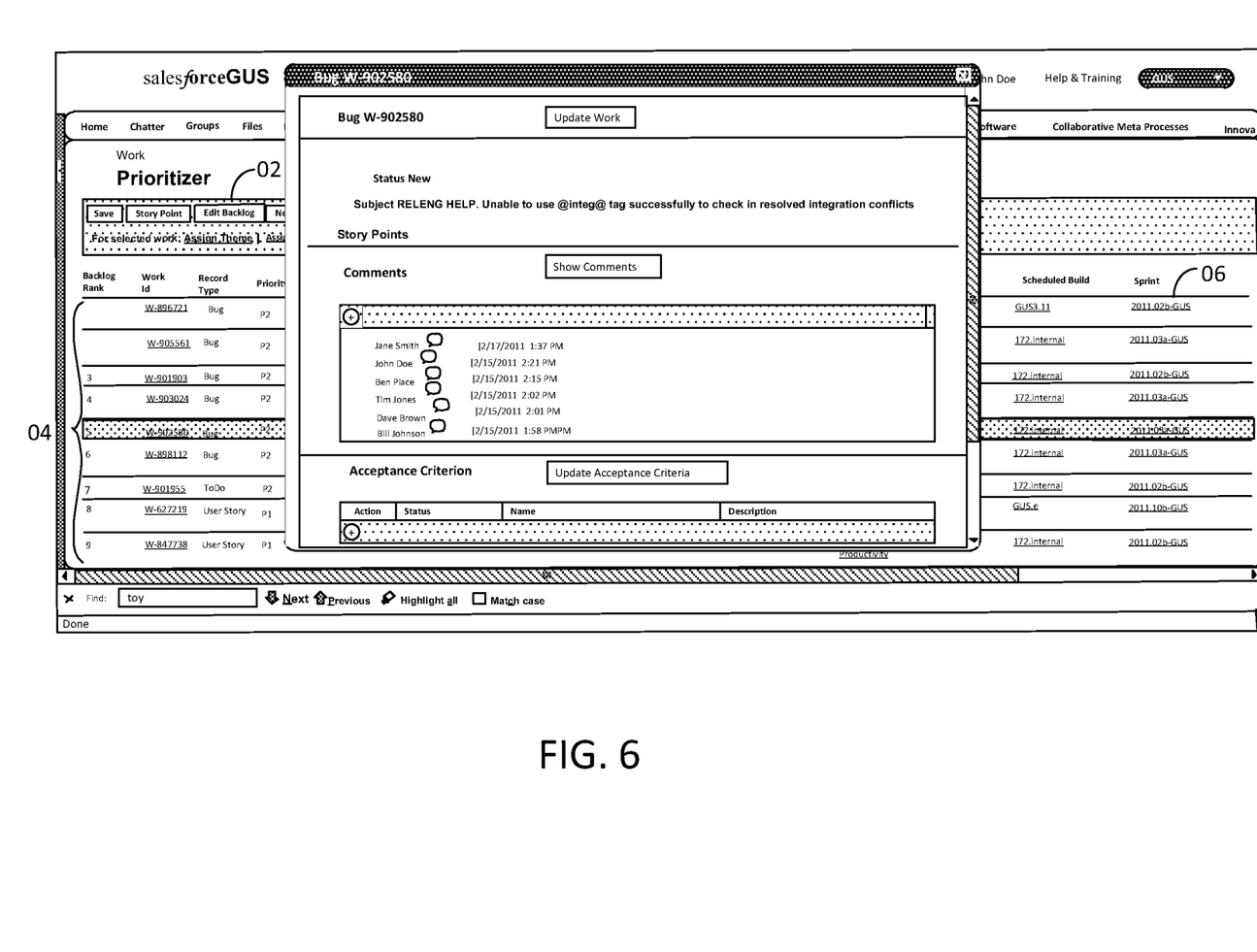
FIG. 6 illustrates a screen shot of an example user interface for performing a quick edit function on a selected line, according to one embodiment.

FIG. 6 is a screen shot of a screen displayed in the browser window when a "Quick Edit" function is selected by, for example, mouse clicking on the chevron icon 08 in a record. The "Quick Edit" screen is generated by the server and sent to the user system to be displayed in the browser window. The "Quick Edit" function obviates the need for the user to access database management software to change the record. Inline editing of fields most commonly changed and adding comments is facilitated.

For example, in FIG. 6 buttons for "Update Work", "Show Comments" and "Update Acceptance Criteria" are displayed. Changes entered are returned to the server which executes database management software to enter the changes in the database record.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, the claims are intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for prioritizing a workload for a specific team, the method comprising:

receiving, at a server, a request for priority information from a user system, with the user system and the server coupled to a network, and with the request including an identity of the specific team;

accessing, using a processor of the server, a workload database object, wherein the workload database object comprises a plurality of records each corresponding to a particular task to be performed by the specific team, and wherein each of the plurality of records comprises priority information for a particular task that specifies a value that identifies a relative priority assigned to that particular task by the specific team with respect to other tasks assigned to the specific team;

obtaining from the workload database object, using the processor of the server, the plurality of records for each of the other tasks assigned to the specific team;

building, using the processor of the server, a prioritizer screen for the specific team that comprises a plurality of rows each corresponding to a particular record for a particular task, wherein each of the plurality of rows comprises a backlog rank field that includes priority information from the workload database object assigned for that particular task by the specific team, and wherein building the prioritizer screen for the specific team comprises using the priority information obtained from the workload database object, by the processor of the server, to automatically and sequentially order the plurality of rows presented in the prioritizer screen to provide a prioritized list of tasks to be completed by the specific team;

sending, from the server, the prioritizer screen to the user system, with the prioritizer screen configured to be displayed in a window of a browser application executing on the user system;

receiving, at the server, reprioritizing information from the user system, wherein the reprioritizing information comprises: selection information indicating that a user has selected at least one row in the prioritizer screen, and dragged and dropped the selected at least one row at a new location in the prioritizer screen that is displayed in the window of the browser application executing on the user system, and change information indicating a new value for the backlog rank field for the selected at least one row;

building, using the reprioritizing information by the processor of the server, a revised prioritizer screen having the plurality of rows reordered according to the reprioritizing information, wherein each of the plurality of rows in the revised prioritizer screen comprises a revised backlog rank field that indicates revised priority information for that row corresponding to reordering of the plurality of rows; and sending, from the server, the revised prioritizer screen to the user system, with the revised prioritizer screen configured to be displayed in the window of the browser application executing on the user system.

2. The method of claim 1, further comprising:

receiving, at the server, an indication from the user system that the revised priority information is to be saved; and entering, using the processor of the server, the revised priority information into the workload database object.

3. The method of claim 1, wherein the reprioritizing information comprises:

selection information indicating that a user has selected a plurality of rows in the prioritizer screen, and dragged and dropped the selected plurality of rows to new locations in the prioritizer screen to reorder the selected plurality of rows and the prioritized list of tasks that are displayed in the prioritizer screen that is displayed in the window of the browser application executing on the user system, and change information indicating new values for each backlog rank field for each of the selected plurality of rows, wherein the change information is used to reorder the selected plurality of rows that are displayed in the prioritizer screen as the prioritized list of tasks.

4. The method of claim 3, wherein the selection information indicates that a user has selected a plurality of rows that are adjacent to each other in the prioritizer screen, and dragged and dropped the selected plurality of rows that are adjacent to each other to new locations in the prioritizer screen to reorder the selected plurality of rows and the prioritized list of tasks that are displayed in the prioritizer screen that is displayed in the window of the browser application executing on the user system.

5. The method of claim 3, wherein the selection information indicates that a user has selected a plurality of rows at least some of which are non-adjacent to each other in the prioritizer screen, and dragged and dropped the selected plurality of rows to new locations in the prioritizer screen to reorder the selected plurality of rows and the prioritized list of tasks that are displayed in the prioritizer screen that is displayed in the window of the browser application executing on the user system.

6. The method of claim 1, wherein each of the plurality of rows comprises a plurality of fields associated with a particular task, and wherein the plurality of fields in each of the plurality of rows for a particular task comprise:

the backlog rank field; and a priority field that identifies a global priority assigned to that particular task that indicates a level of commitment to complete that particular task.

7. The method of claim 6, wherein the plurality of fields in each of the plurality of rows for a particular task further comprise:

a work id field that provides a link to a particular record in the workload database object;

a record type field that identifies a type of the particular record in the workload database object;

a subject field that identifies a subject of the particular record in the workload database object;

a story points field comprising a number of points that indicate relative size of effort for that particular task associated with that particular record compared to size of other efforts for other tasks, associated with other records, to be performed by the specific team;

a theme field that indicates a theme of which a user story is a part;

a scheduled build field that identifies which code line a feature will go into production; and a sprint field that indicates a time period when the particular task is to be completed.

8. A system for prioritizing a workload for a specific team, the system comprising:

means for receiving a request for priority information from a user system, with the user system coupled to a network, and with the request including an identity of the specific team;

means for accessing a workload database object, wherein the workload database object comprises a plurality of records each corresponding to a particular task to be performed by the specific team, and wherein each of the plurality of records comprises priority information for a particular task that specifies a value that identifies a relative priority assigned to that particular task by the specific team with respect to other tasks assigned to the specific team;

means for obtaining from the workload database object the plurality of records for each of the other tasks assigned to the specific team;

means for building a prioritizer screen for the specific team that comprises a plurality of rows each corresponding to a particular record for a particular task, wherein each of the plurality of rows comprises a backlog rank field that includes priority information from the workload database object assigned for that particular task by the specific team, and wherein building the prioritizer screen for the specific team comprises using the priority information obtained from the workload database object to automatically and sequentially order the plurality of rows presented in the prioritizer screen to provide a prioritized list of tasks to be completed by the specific team;

means for sending the prioritizer screen to the user system, with the prioritizer screen configured to be displayed in a window of a browser application executing on the user system;

means for receiving reprioritizing information from the user system, wherein the reprioritizing information comprises: selection information indicating that a user has selected at least one row in the prioritizer screen, and dragged and dropped the selected at least one row at a new location in the prioritizer screen that is displayed in the window of the browser application executing on the user system, and change information indicating a new value for the backlog rank field for the selected at least one row;

means for building, using the reprioritizing information, a revised prioritizer screen having the plurality of rows reordered according to the reprioritizing information, wherein each of the plurality of rows in the revised prioritizer screen comprises a revised backlog rank field that indicates revised priority information for that row corresponding to reordering of the plurality of rows; and means for sending the revised prioritizer screen to the user system, with the revised prioritizer screen configured to be displayed in the window of the browser application executing on the user system.

9. The system of claim 8, further comprising:

means for receiving an indication from the user system that the revised priority information is to be saved; and means for entering the revised priority information into the workload database object.

10. The system of claim 8, wherein the reprioritizing information comprises:

selection information indicating that a user has selected a plurality of rows in the prioritizer screen, and dragged and dropped the selected plurality of rows to new locations in the prioritizer screen to reorder the selected plurality of rows and the prioritized list of tasks that are displayed in the prioritizer screen that is displayed in the window of the browser application executing on the user system, and change information indicating new values for each backlog rank field for each of the selected plurality of rows, wherein the change information is used to reorder the selected plurality of rows that are displayed in the prioritizer screen as the prioritized list of tasks.

11. The system of claim 10, wherein the selection information indicates that a user has selected a plurality of rows that are adjacent to each other in the prioritizer screen, and dragged and dropped the selected plurality of rows that are adjacent to each other to new locations in the prioritizer screen to reorder the selected plurality of rows and the prioritized list of tasks that are displayed in the prioritizer screen that is displayed in the window of the browser application executing on the user system.

12. The system of claim 10, wherein the selection information indicates that a user has selected a plurality of rows at least some of which are non-adjacent to each other in the prioritizer screen, and dragged and dropped the selected plurality of rows to new locations in the prioritizer screen to reorder the selected plurality of rows and the prioritized list of tasks that are displayed in the prioritizer screen that is displayed in the window of the browser application executing on the user system.

13. The system of claim 8, wherein each of the plurality of rows comprises a plurality of fields associated with a particular task, and wherein the plurality of fields in each of the plurality of rows for a particular task comprise:

the backlog rank field; and a priority field that identifies a global priority assigned to that particular task that indicates a level of commitment to complete that particular task.

14. The system of claim 13, wherein the plurality of fields in each of the plurality of rows for a particular task further comprise:

a work id field that provides a link to a particular record in the workload database object;

a record type field that identifies a type of the particular record in the workload database object;

a subject field that identifies a subject of the particular record in the workload database object;

a story points field comprising a number of points that indicate relative size of effort for that particular task associated with that particular record compared to size of other efforts for other tasks, associated with other records, to be performed by the specific team;

a theme field that indicates a theme of which a user story is a part;

a scheduled build field that identifies which code line a feature will go into production; and a sprint field that indicates a time period when the particular task is to be completed.

15. An apparatus for prioritizing a workload for a specific team, the apparatus comprising:

a server, including a processor and one or more memory modules storing a workload database object and program code, with the server configured to receive a request for priority information from a user system, with the user system and the server coupled to a network, with the request including an identity of the specific team, and with the processor coupled to the one or more memory modules and configured to execute the program code to:

access a workload database object, wherein the workload database object comprises a plurality of records each corresponding to a particular task to be performed by the specific team, and wherein each of the plurality of records comprises priority information for a particular task that specifies a value that identifies a relative priority assigned to that particular task by the specific team with respect to other tasks assigned to the specific team;

obtain from the workload database object the plurality of records for each of the other tasks assigned to the specific team;

build a prioritizer screen for the specific team that comprises a plurality of rows each corresponding to a particular record for a particular task, wherein each of the plurality of rows comprises a backlog rank field that includes priority information from the workload database object assigned for that particular task by the specific team, and wherein building the prioritizer screen for the specific team comprises using the priority information obtained from the workload database object to automatically and sequentially order the plurality of rows presented in the prioritizer screen to provide a prioritized list of tasks to be completed by the specific team;

send the prioritizer screen to the user system, with the prioritizer screen configured to be displayed in a window of a browser application executing on the user system;

receive reprioritizing information from the user system, wherein the reprioritizing information comprises: selection information indicating that a user has selected at least one row in the prioritizer screen, and dragged and dropped the selected at least one row at a new location in the prioritizer screen that is displayed in the window of the browser application executing on the user system, and change information indicating a new value for the backlog rank field for the selected at least one row;

build, using the reprioritizing information, a revised prioritizer screen having the plurality of rows reordered according to the reprioritizing information, wherein each of the plurality of rows in the revised prioritizer screen comprises a revised backlog rank field that indicates revised priority information for that row corresponding to reordering of the plurality of rows; and send the revised prioritizer screen to the user system, with the revised prioritizer screen configured to be displayed in the window of the browser application executing on the user system.

16. The apparatus of claim 15, wherein the processor is further configured to execute the program code to:

receive an indication from the user system that the revised priority information is to be saved; and enter the revised priority information into the workload database object.

17. The apparatus of claim 15, wherein the reprioritizing information comprises:

selection information indicating that a user has selected a plurality of rows in the prioritizer screen, and dragged and dropped the selected plurality of rows to new locations in the prioritizer screen to reorder the selected plurality of rows and the prioritized list of tasks that are displayed in the prioritizer screen that is displayed in the window of the browser application executing on the user system, and change information indicating new values for each backlog rank field for each of the selected plurality of rows, wherein the change information is used to reorder the selected plurality of rows that are displayed in the prioritizer screen as the prioritized list of tasks.

18. The apparatus of claim 17, wherein the selection information indicates that a user has selected a plurality of rows that are adjacent to each other in the prioritizer screen, and dragged and dropped the selected plurality of rows that are adjacent to each other to new locations in the prioritizer screen to reorder the selected plurality of rows and the prioritized list of tasks that are displayed in the prioritizer screen that is displayed in the window of the browser application executing on the user system.

19. The apparatus of claim 17, wherein the selection information indicates that a user has selected a plurality of rows at least some of which are non-adjacent to each other in the prioritizer screen, and dragged and dropped the selected plurality of rows to new locations in the prioritizer screen to reorder the selected plurality of rows and the prioritized list of tasks that are displayed in the prioritizer screen that is displayed in the window of the browser application executing on the user system.

20. The apparatus of claim 15, wherein each of the plurality of rows comprises a plurality of fields associated with a particular task, and wherein the plurality of fields in each of the plurality of rows for a particular task comprise:

the backlog rank field; and a priority field that identifies a global priority assigned to that particular task that indicates a level of commitment to complete that particular task.

21. The apparatus of claim 20, wherein the plurality of fields in each of the plurality of rows for a particular task further comprise:

a work id field that provides a link to a particular record in the workload database object;

a record type field that identifies a type of the particular record in the workload database object;

a subject field that identifies a subject of the particular record in the workload database object;

a story points field comprising a number of points that indicate relative size of effort for that particular task associated with that particular record compared to size of other efforts for other tasks, associated with other records, to be performed by the specific team;

a theme field that indicates a theme of which a user story is a part;

a scheduled build field that identifies which code line a feature will go into production; and a sprint field that indicates a time period when the particular task is to be completed.

22. A method for prioritizing a workload for a specific team of a plurality of teams that are distributed across multiple business units during a software development process, the method comprising:

receiving, at a server of an on-demand database system, a request for priority information communicated from a user system, with the user system and the server coupled to a network and using inter-process communications over the network to communicate with each other, and with the request including an identity of a specific team of the plurality of teams;

accessing, using a processor of the on-demand database system, a workload database object, wherein the workload database object comprises a plurality of records each corresponding to a particular task to be performed by the specific team, and wherein each of the plurality of records comprises priority information for a particular task that specifies a value that identifies a relative priority assigned to that particular task by the specific team with respect to other tasks assigned to the specific team;

obtaining from the workload database object, using the processor of the on-demand database system, the plurality of records for each of the other tasks assigned to the specific team;

building, using the processor of the on-demand database system, a prioritizer screen for the specific team, wherein the prioritizer screen comprises a plurality of rows, wherein each of the plurality of rows corresponds to a particular record for a particular task, and wherein building the prioritizer screen for the specific team comprises:

building a row for each particular record, wherein each of the plurality of rows comprises a plurality of fields for that particular task, and wherein the plurality of fields comprise a backlog rank field that includes priority information from the workload database object assigned for that particular task by the specific team that specifies the value that identifies the relative priority assigned to that particular task by the specific team with respect to the other tasks assigned to the specific team; and using the priority information obtained from the workload database object to automatically and sequentially order the plurality of rows presented in the prioritizer screen to provide a prioritized list of tasks to be completed by the specific team;

sending, from the server of the on-demand database system, the prioritizer screen to the user system, with the prioritizer screen configured to be displayed in a window of a browser application executing on the user system;

receiving, at the server of the on-demand database system, reprioritizing information via an interprocess communication from the user system, wherein the reprioritizing information comprises: (1) selection information indicating that a user has selected a plurality of rows in the prioritizer screen, and dragged and dropped the selected plurality of rows to new locations in the prioritizer screen to reorder the selected plurality of rows and the prioritized list of tasks that are displayed in the prioritizer screen that is displayed in the window of the browser application executing on the user system, and (2) change information indicating new values for each backlog rank field for each of the selected plurality of rows, and wherein the change information is used to reorder the selected plurality of rows that are displayed in the prioritizer screen as the prioritized list of tasks;

building, using the processor of the on-demand database system, a revised prioritizer screen having the plurality of rows reordered according to the reprioritizing information and having revised priority information corresponding to reordering of the plurality of rows;

sending, from the server of the on-demand database system, the revised prioritizer screen to the user system, with the revised prioritizer screen configured to be displayed in the window of the browser application executing on the user system;

receiving, at the server of the on-demand database system, an indication from the user system that the revised priority information is to be saved; and entering, in response to receiving the indication from the user system, using the processor of the on-demand database system, the revised priority information into the workload database object.

* * * * *